United States Patent [19]

Teske et al.

[11] 4,083,462
[45] Apr. 11, 1978

[54] APPARATUS FOR DISCHARGING BULK MATERIAL FROM STORAGE TANKS

[76] Inventors: Fritz Teske, Industriestrasse 28;
Lothar Teske, Industriestrasse 30,
both of D-5000 Koln 90, Germany

[21] Appl. No.: 764,562

[22] Filed: Feb. 1, 1977

[30] Foreign Application Priority Data

Feb. 3, 1976 Germany .............................. 2603964

[51] Int. Cl.² ............................................. B65G 65/48
[52] U.S. Cl. .................... 214/17 D; 222/63; 222/239; 222/410
[58] Field of Search ............... 214/17 D; 222/55, 410, 222/238–242, 63; 198/675, 642; 302/38; 259/178 A, 108

[56] References Cited

U.S. PATENT DOCUMENTS

| | | | |
|---|---|---|---|
| 3,278,062 | 10/1966 | Densmore | 214/17 D X |
| 3,465,685 | 9/1969 | Sherrod | 198/675 X |
| 3,927,774 | 12/1975 | Teske | 214/17 D |

FOREIGN PATENT DOCUMENTS 2,400,432  10/1975  Germany .......................... 259/178 A

*Primary Examiner*—Albert J. Makay
*Attorney, Agent, or Firm*—Spencer & Kaye

[57] ABSTRACT

An apparatus for discharging bulk material from a storage tank includes a support shaft; an impeller wheel mounted on the support shaft in the vicinity of the storage tank floor; and a stepping mechanism for intermittently moving the impeller wheel in either direction. The stepping mechanism has a ratchet wheel mounted on the support shaft and connected to the impeller wheel and a pawl mechanism cooperating with the ratchet wheel. A power cylinder, connected to a hydraulic circuit, is provided for moving the pawl mechanism. Further, there are provided a sensor arrangement for sensing the magnitude of the resistance of the bulk material to the motion of the impeller wheel and a control arrangement connected to the sensor arrangement and the pawl mechanism for reversing the direction of rotation of the impeller wheel when the resistance reaches a predetermined magnitude. The impeller wheel has at least one impeller vane associated with a discharge opening in the storage tank floor.

14 Claims, 4 Drawing Figures

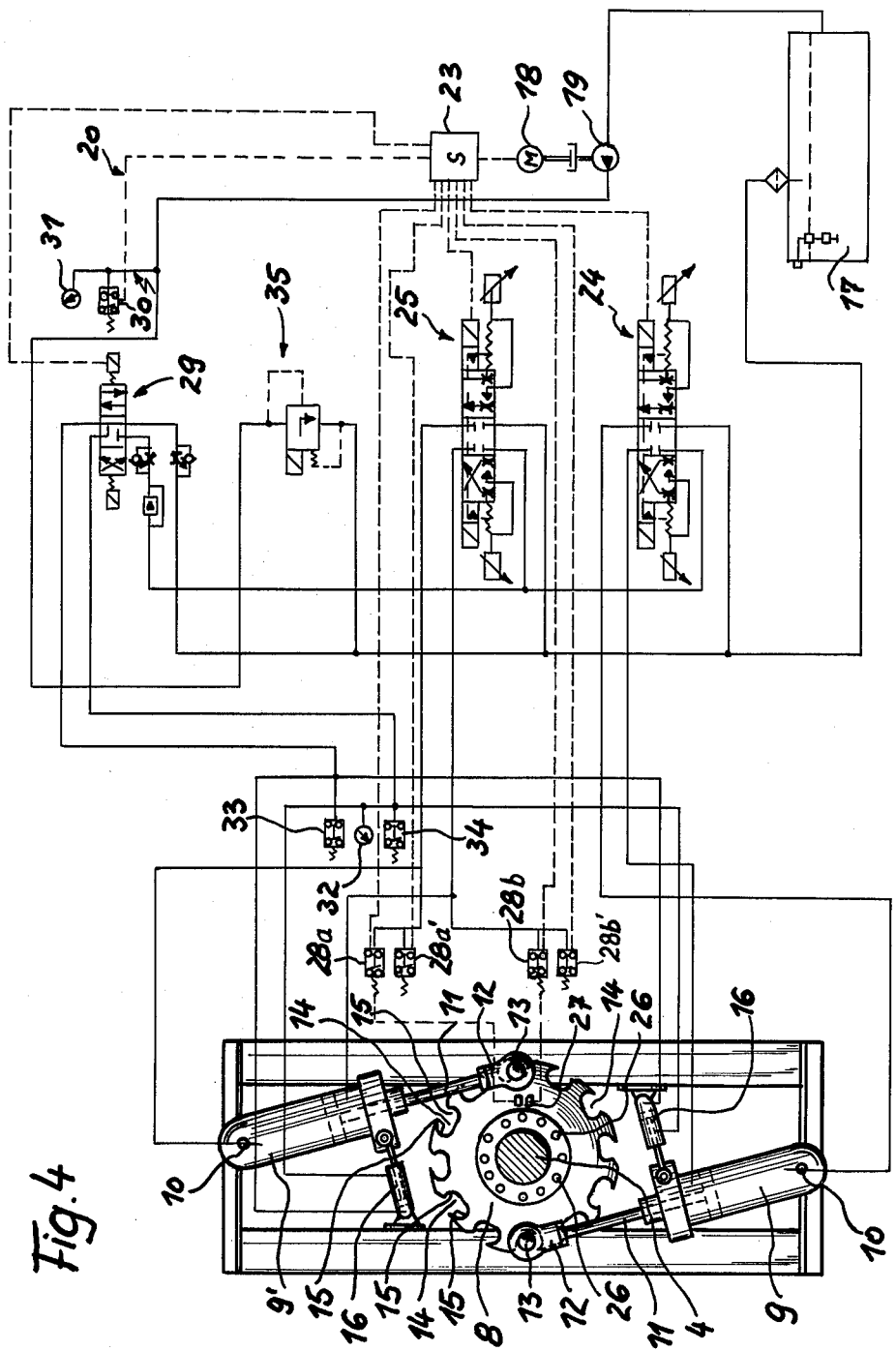

APPARATUS FOR DISCHARGING BULK MATERIAL FROM STORAGE TANKS

BACKGROUND OF THE INVENTION

This invention relates to an apparatus for discharging bulk material from a storage tank and is of the type which has a vaned impeller wheel disposed above a housing floor which closes off the lower, terminal portion of the storage tank and which has at least one eccentrically arranged discharge opening. The impeller is driven by a stepping mechanism, the ratchet-and-pawl assembly of which is disposed on the impeller shaft underneath the housing floor and includes at least one pawl-actuating member designed as a pressure medium-actuated power cylinder.

Apparatuses of the above-outlined type have the purpose of eliminating material accumulations in the storage tank to thus insure an unimpeded discharge of the bulk material through the discharge openings.

It is known - as disclosed in German (German Democratic Republic) Pat. No. 43,491 - to continuously rotate the impeller wheel.

In U.S. Pat. No. 3,927,774 there is disclosed an apparatus of the above type which is significantly more economical both from the structural and from the operational point of view. As disclosed in this patent, the impeller wheel is driven by means of a stepping mechanism intermittently in the same direction.

In all known apparatuses, however, particularly in those where the discharge opening is arranged eccentrically with respect to the impeller shaft, the danger of the impeller wheel being blocked by the bulk material has not been eliminated.

SUMMARY OF THE INVENTION

It is an object of the invention to provide an improved discharge apparatus for bulk material stored in storage tanks in which the blockage of the impeller wheel by the bulk material is eliminated without the necessity of providing additional means for loosening the bulk material.

This object and others to become apparent as the specification progresses, are accomplished by the invention, according to which, briefly stated, the apparatus for discharging bulk material from a storage tank includes a support shaft; an impeller wheel mounted on the support shaft in the vicinity of the storage tank floor; and a stepping mechanism for intermittently moving the impeller wheel in either direction. The stepping mechanism has a ratchet wheel mounted on the support shaft and connected to the impeller wheel and a pawl mechanism cooperating with the ratchet wheel. A power cylinder, connected to a hydraulic circuit, is provided for moving the pawl mechanism. Further, there are provided a sensor arrangement for sensing the magnitude of the resistance of the bulk material to the motion of the impeller wheel and a control arrangement connected to the sensor arrangement and the pawl mechanism for reversing the direction of rotation of the impeller wheel when the resistance reaches a predetermined magnitude. The impeller wheel has at least one impeller vane associated with a discharge opening in the storage tank floor.

Based on the recognition that the rotational resistance exerted by the bulk material in the storage container on the impeller wheel increases with the distance from the discharge opening, there is obtained, according to the invention, a discharge apparatus with which the bulk material is loosened, particularly in the zone of the discharge opening and as a function of the rotational resistance. In this manner, on the one hand, a blockage of the impeller wheel cannot occur, because after reaching a predetermined rotational resistance and upon the successive reversal of the direction of impeller wheel rotation, the impeller vane is displaced at all times in material zones which have a smaller rotational resistance than heretofore possible. On the other hand, by means of the asymmetrical loosening of the bulk material, a bridge formation which would at least hinder the discharge process, is rendered more difficult.

According to a feature which is particularly advantageous because of simple manufacture and robust construction, both tooth flanks of each tooth gap in the ratchet wheel of the stepping mechanism are designed as effective tooth flanks, that is, they both serve for the transmission of the pulling or pushing forces exerted by the power cylinder coupled to the pawl mechanism. Further, with the pawl mechanism there is associated a setting member which is operated by the control arrangement and which serves for selectively coupling the pawl mechanism with, or, as the case may be, disconnecting it from the ratchet wheel. Advantageously, the setting member is constituted by a pressure medium-operated power cylinder connected to the hydraulic system which energizes the power cylinder of the pawl mechanism.

According to a further advantageous feature of the invention, the measuring of the rotational resistance is performed by means of the effective pressure of the pressure medium with the aid of devices comparing the pressure with predetermined values. These devices affect the control components of the pawl mechanism. Such an arrangement can be provided by optimally simple means. Further, the possibility is provided to vary steplessly the predeterminable values to which the apparatus should respond.

According to a further advantageous feature of the invention, the pawl mechanism advances the ratchet wheel by one tooth division and further, on the shaft there are provided a plurality of switching fingers (pins) which are evenly distributed along the circumference and which correspond in number to that of the teeth of the ratchet wheel. The switching pins cooperate with stationary sensors (which are affixed to the container frame) in such a manner that only when a switching pin moves past the sensors do the latter actuate the control device as a function of the effective medium pressure for reversing the direction of impeller rotation. Advantageously, the working pressure of the sensors affected by the switching pins is smaller than the maximum permissible pressure of the hydraulic system. Further, there is provided a sensor which is effective independently from the position of the ratchet wheel and which, upon reaching a predetermined maximum permissible pressure of the pressure medium which is in excess of the working pressure of the above-noted sensors, responds and causes the control device to reverse the rotation of the impeller wheel.

By means of the switching pins affixed to the shaft and the sensors which are affixed to the storage vessel frame and the work pressure of which is below the maximum permissible pressure in the hydraulic system, it is insured that the direction of rotation is reversed already at the measuring stations in case during the passage of a switching pin the preset work pressure is reached.

In this manner, on the one hand, the entire apparatus is protected and, on the other hand, the rotational angle of the impeller vane may be preselected as a function of the consistency of the bulk material in order to insure the desired asymmetrical loosening of the bulk material in the zone of the discharge opening of the storage tank.

In case between two measuring stations there is first obtained the predetermined work pressure which is below the maximum permissible pressure, it is insured that a reversal of the direction of impeller rotation is achieved in order to exclude the possibility of an overloading of the entire apparatus and a blockage of the impeller wheel.

According to a further feature of the invention, the cross section of the impeller vanes have essentially the shape of isosceles triangles with an obtuse angle and are arranged in such a manner that the long cross-sectional side is always parallel to the housing floor and further, the angle which is opposite the long cross-sectional side increases continuously up to a maximum of 180° from the hub towards the free vane end.

By means of the above-outlined structure of the impeller vanes, the latter need much less force for loosening the bulk material than what has been needed heretofore for cutting through the bulk material. Further, such structure insures a high degree of form stability for the impeller vanes.

Dependent upon the property of the bulk material, it is advantageous to arrange, in addition to a sole impeller vane, one, or preferably two or more further impeller vanes in a circumferentially uniformly distributed manner. These additional vanes have smaller material-engaging faces than the first-noted (principal) impeller vane. Further, advantageously, the impeller vanes which have the small material engaging faces are shorter than (preferably less than half as long as) the principal impeller vane.

BRIEF DESCRIPTION OF THE DRAWINGS

FIG. 4 is a sectional view taken along line IV—IV of FIG. 1 and schematically shows, in addition, a hydraulic control system for driving the apparatus.

DESCRIPTION OF THE PREFERRED EMBODIMENT

Figure 1:
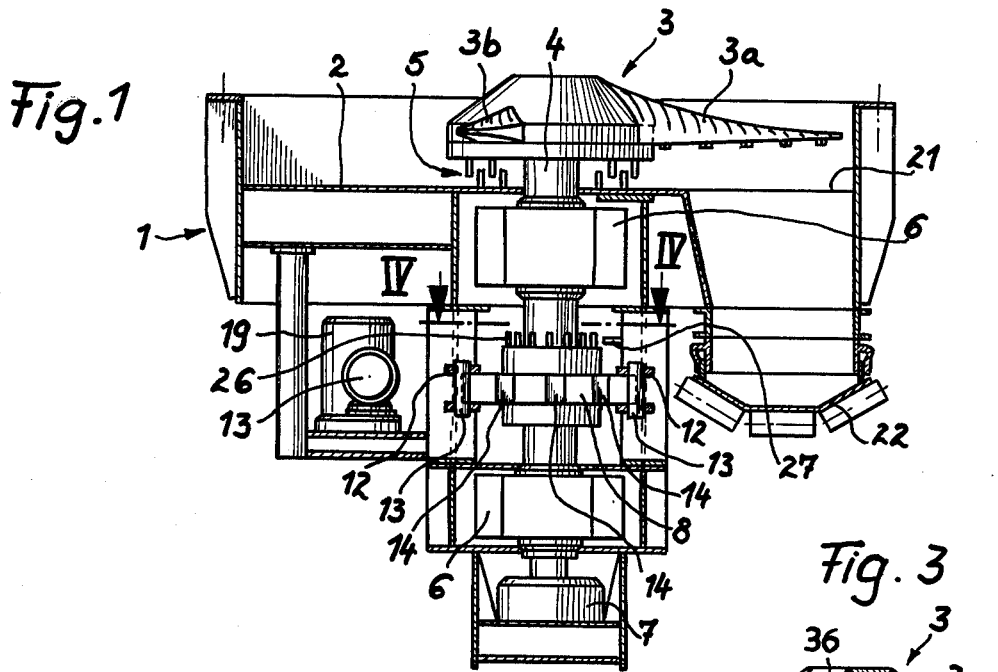
FIG. 1 is a side elevational sectional view of a preferred embodiment of the invention.
Figure 2:
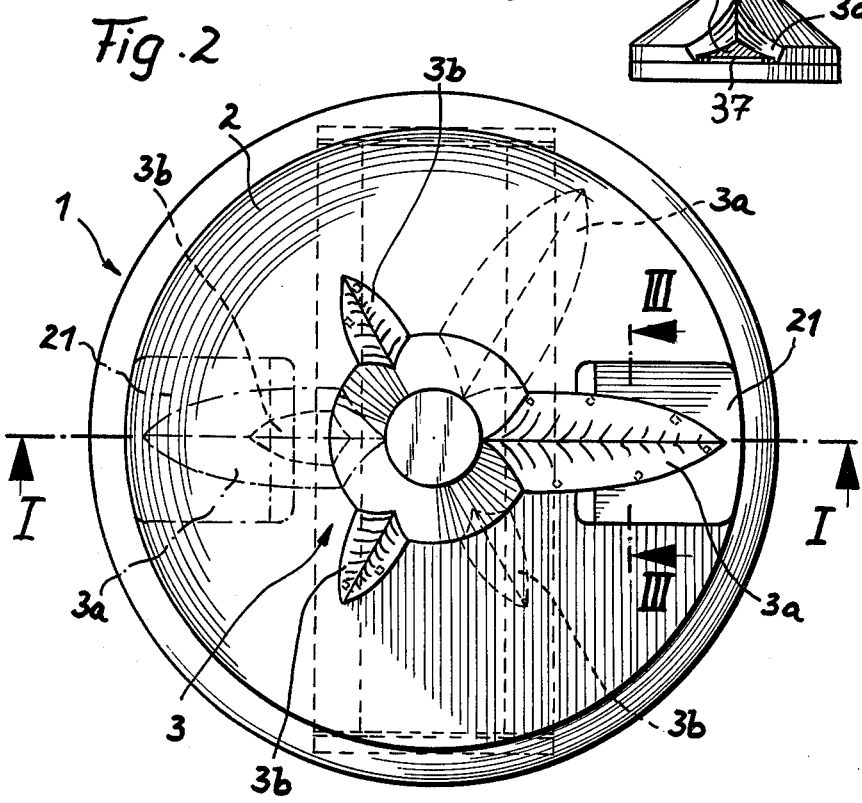
FIG. 2 is a top plan view of the same embodiment.

Turning now to FIGS. 1 and 2, the material discharge device illustrated therein comprises a bulk material storage tank which is of cylindrical shape and which is open at the top (not shown) and to the lower end of which there is attached a housing 1 having vertical or inclined walls. The housing 1 has a horizontal floor 2 above which there is arranged an impeller wheel 3 which has one long impeller vane 3a and two short impeller vanes 3b. The impeller wheel 3 is affixed to support shaft 4 which passes through the housing floor 2 in a sealed manner. The seal is constituted by a labyrinth seal 5.

Radial bearings 6 and 6' as well as an axial bearing 7 (all stationarily mounted in the frame) are provided for the rotational support of the shaft 4.

Also referring now to FIG. 4, for driving the impeller wheel 3 there is provided a stepping mechanism comprising a ratchet wheel 8 disposed between the radial bearings 6 and 6' on the shaft 4 and two stationarily supported pawl mechanisms. The latter are formed of two diametrically arranged, hydraulic double-acting power cylinders 9 and 9' which are pivotally supported by vertically oriented pivot pins 10. The power cylinders 9 and 9' have pistons with associated piston rods 11 which carry fork members 12, each supporting a pin member 13 that extends parallel to the shaft 4 and that is adapted to engage the tooth gaps 14 of the ratchet wheel 8.

Each tooth flank 15 of the ratchet wheel 8 is undercut to conform to the peripheral shape of the pins 13, so that the ratchet wheel 8 can be driven in both directions by the pawl mechanisms.

To each power cylinder 9 and 9' there is coupled a separate power cylinder 16 (setting member) supported on the housing frame and articulated to the respective power cylinder 9 and 9' for a pivotal motion about a vertical axis.

All the power cylinders 9, 9' and 16 are coupled to a hydraulic system schematically illustrated in FIG. 4. The system comprises a reservoir 17, a pump 19 driven by an electromotor 18 and a control 20.

In the housing floor 2 there is provided a discharge opening 21 below which there is arranged a continuous conveyor, for example, a belt conveyor 22.

In the description that follows, the mode of operation of the discharge apparatus constructed according to the invention will be set forth.

The basic position of the impeller vane 3a is illustrated in dash-lines in FIG. 2. The impeller vane 3a is moved into the basic position by means of a switch cam (not shown) affixed to the ratchet wheel 8 and a sensor which is attached to the housing frame and which affects an electric control 23 in such a manner that subsequent to the de-energization of the apparatus, the impeller wheel 3 comes to a stanstill only after the long vane 3a has reached the basic position.

If now the electromotor 18 is energized, the pump 19 delivers pressurized hydraulic medium through three-way valves 24 and 25 into those work chambers of the cylinders 9 and 9' that are remote from the respective piston rods 11. As a result, the piston rods 11 move outwardly from their respective cylinders and the rachet wheel 8 is rotated clockwise until it assumes its position illustrated in FIG. 4. Shortly before reaching this position, one of the twelve switching pins 26 (which are arranged on the ratchet wheel 8 having twelve teeth and which are uniformly distributed thereon) moves past the sensor 27 (arranged stationarily on the housing frame). In response, the sensor 27 energizes the electro-hydraulic switch 28a and 28b respectively, for measuring the pressure of the hydraulic medium.

The switches 28a are connected to those chambers of the cylinders 9, 9' which are remote from the piston rods 11 while the switches 28b are coupled to those cylinder chambers in which extend the piston rods 11.

If, at this moment, the effective pressure of the hydraulic medium is smaller than the preset pressure at the electro-hydraulic switch 28a - 28b (for example 200 bars) - this applies with certainty in the above-noted position of the ratchet wheel 8, because the resistance of the bulk material to the motion of the vane 3a decreases in the direction of the discharge opening - first the piston rods 11, affected by the electric control 23, are withdrawn by an amount corresponding to the depth of the undercut portion of the tooth flanks 15 and then those work chambers of the power cylinders 16 which are remote from the piston rods are pressurized with hydraulic medium through the multi-way valve 29. As a result, the piston rods of the power cylinders 16 move outwardly from their respective cylinders to such an extent that the pawls 12, 13 are lifted out of the tooth gaps 14 by virtue of the counterclockwise pivotal motion of the power cylinders 9, 9′ about the respective pivot 10. Thereafter, by pressurizing the chambers of the cylinders 9, 9′ at the piston rod side, the piston rods 11 of the power cylinders 9, 9′ are withdrawn to an extent, until the respective pawls 12, 13 associated with the two power cylinders 9, 9′ are situated in front of the adjoining tooth gaps 14. Then, again, on command by the electric control 23, controlled by the valve 29, the work chambers on the piston rod side of the double-acting power cylinders 16 are pressurized with hydraulic medium and thus the pawls 12, 13 are again brought into engagement with the ratchet wheel 8.

Upon reaching this position, those work chambers of the power cylinders 9, 9′ which are remote from the piston rods 11 are pressurized on command by the electric control 23, and, as a result, the ratchet wheel 8 and thus the impeller wheel 3 are again moved in the clockwise direction as viewed in FIG. 4.

The individual switching positions are sequentially controlled by further sensors, not shown.

The above-described stepwise rotation of the impeller wheel 3 is repeated until at a measuring station the effective pressure in the hydraulic system exceeds a preset work pressure of, for example, 200 bars due to the resistance exerted by the bulk material on the impeller wheel 3. In such a case, upon reaching a measuring station, the electromagnetically displaceable multi-hydraulic switch 28a, 28b moved in such a manner by the electric control 23 that the work chambers of the power cylinders 9, 9′ on the piston rod side are pressurized and, as a result, the ratchet wheel 8 is turned in the opposite, counterclockwise direction.

At the successive measuring station then the pawls 12, 13 are engaged with and, respectively, disengaged from the ratchet wheel 8 in a reverse order for such a duration until, on the upstream side of the discharge opening 21, the effective pressure of the hydraulic medium again exceeds 200 bars.

If, however, between two adjoining measuring stations the maximum permissible hydraulic pressure of, for example, 300 bars is reached, for example, because of a possible sudden deposition of the bulk material, the electric control 23, affected by the electro-hydraulic sensor switch 30 and/or by the electro-hydraulic switch 28a′, 28b′, causes a reversal of the rotation of the discharge impeller 3 even before it reaches the subsequent measuring station.

Further, in the hydraulic system there are provided pressure gauges 31 and 32 as well as electro-hydraulic switches 33 and 34 for the purpose of monitoring the presence of an overpressure.

Also, there is provided a hydraulically operating safety valve 35 which is effective in case a breakdown occurs in the electro-hydraulic switches.

In certain cases it may be advantageous to arrange in the housing floor 2, diametrically opposite discharge opening 21, a further discharge opening and, on the impeller wheel 3, a further long impeller vane as indicated in dash-dot lines in FIG. 2. In such a case it is expedient to omit the short impeller vanes 3b.

It is thus seen that every time a switching pin 26 moves past the position sensor 27, the latter activates the pressure sensor switches 28a, 28b which emit a signal corresponding to the sensed pressure in the hydraulic conduits. This sensed pressure, in turn, is a measure of the resistance encountered by the impeller wheel 3 during its rotation. The signals emitted by the pressure sensor switches 28a, 28b are applied to the electric control 23 in which they are compared with a set magnitude. Thus, if the pressure exceeds a predetermined value, the control 23 actuates the valves 24 and 25 to reverse the operation of the power cylinders 9, 9′, thus reversing the rotation of the impeller wheel 3.

Figure 3:
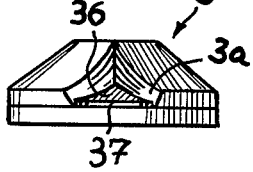
FIG. 3 is a sectional view of a detail of FIG. 2, taken along line III—III.

According to the invention, any cross section of the impeller vanes have essentially the shape of an isosceles triangle with an obtuse angle and is arranged in such a manner that the long cross-sectional side is always parallel to the housing floor and further, the angle which is opposite the long cross-sectional side, increases continuously up to a maximum of 180° from the hub towards the free end of the vane. FIG. 3 illustrates the impeller vane 3a in cross section, taken along line III—III of FIG. 2. It is seen that the cross-sectional area has the shape of an isosceles triangle 36, the longest side (base) 37 of which extends parallel to the horizontal housing floor 2 as apparent from a comparison of FIG. 2 with FIG. 3.

It will be understood that the above description of the present invention is susceptible to various modifications, changes, and adaptations, and the same are intended to be comprehended within the meaning and range of equivalents of the appended claims.

What is claimed is:

1. In an apparatus for discharging bulk material from a storage tank that includes a floor provided with at least one eccentrically disposed discharge opening; the apparatus including a support shaft; an impeller wheel mounted on the support shaft in the vicinity of the floor; a stepping mechanism for intermittently moving the impeller wheel for loosening material accumulations in the storage tank to enhance an unimpeded discharge of the bulk material downwardly through the discharge opening; the stepping mechanism having a ratchet wheel mounted on the support shaft and connected to the impeller wheel and a pawl mechanism cooperating with the ratchet wheel and having at least one power cylinder for moving the pawl mechanism; and a hydraulic circuit coupled to the power cylinder for energizing the same; the improvement comprising
   (a) means forming part of said stepping mechanism for selectively rotating said impeller wheel in either direction;
   (b) sensor means for sensing the magnitude of the resistance of the bulk material to the motion of said impeller wheel;
   (c) control means connected to said sensor means and said stepping mechanism for reversing the direction of rotation upon said resistance reaching a predetermined magnitude; and
   (d) at least one impeller vane forming part of said impeller wheel and associated with said at least one discharge opening; said vane being arranged for moving past its associated discharge opening in either direction and including means for effecting loosening of material accumulations independently of its direction of motion to enhance an unimpeded discharge of the bulk material downwardly through the discharge opening upon rotation of said impeller wheel in either direction.

2. An apparatus as defined in claim 1, wherein said ratchet wheel has a plurality of circumferentially distributed ratchet teeth each having tooth flanks; any two adjoining tooth flanks belonging to adjoining ratchet teeth defining a tooth gap for receiving a component of said pawl mechanism; both tooth flanks of any flank pair defining a tooth gap being provided with an effective pawl-engaging face for transmitting to said impeller wheel both pushing and pulling forces exerted to said pawl component by said power cylinder; the improvement further comprising a setting means coupled to said control means and said pawl mechanism for moving said pawl component into and out of said tooth gaps.

3. An apparatus as defined in claim 2, wherein said setting means comprises an additional power cylinder hydraulically coupled to said circuit and mechanically connected to said power cylinder of said pawl mechanism.

4. An apparatus as defined in claim 2, wherein said sensor means includes a pressure sensor connected to said circuit for measuring the effective fluid pressure therein; and wherein said control means includes comparison means for comparing said effective fluid pressure with said predetermined magnitude for effecting actuation of said setting means and said power cylinder of said pawl mechanism.

5. An apparatus as defined in claim 4, wherein said ratchet wheel has a plurality of circumferentially distributed ratchet teeth; said pawl mechanism having a stroke length effecting a rotational motion of said ratchet wheel that corresponds to one tooth division; further comprising a plurality of switching pins affixed to said rachet wheel and corresponding in number to the number of the ratchet teeth; said sensor means further including stationary position sensors connected to said pressure sensor and cooperating with said switching pins for activating said pressure sensor and said control means to reverse said direction of rotation only upon movement of any of said switching pins past said position sensors.

6. An apparatus as defined in claim 5, said sensor means further comprising an additional pressure sensor connected to said hydraulic circuit and said control means for effecting a reversal of said direction of motion independently from the relative positions of said switching pins and said position sensors when the pressure in said hydraulic circuit exceeds a maximum permissible value.

7. An apparatus as defined in claim 1, wherein said impeller wheel has a hub from which said vane extends radially outwardly; any cross-sectional area of said vane having the shape of a triangle with an obtuse angle; the longest side of said triangle being disposed parallel to said floor; the obtuse angle of different vane cross sections continuously increasing to the maximum value of 180° with an increasing distance of the different cross sections from said hub.

8. An apparatus as defined in claim 7, wherein each said cross section has the shape of an isosceles triangle.

9. An apparatus as defined in claim 1, wherein said vane is a main vane; further comprising at least one additional vane having a material-engaging surface that is smaller than that of said main vane; said main and additional vanes are arranged in a circumferentially even distribution.

10. An apparatus as defined in claim 9, wherein each said additional vane is shorter than said main vane.

11. An apparatus as defined in claim 10, wherein each said additional vane is less than one half as long as said main vane.

12. In an apparatus for discharging bulk material from a storage tank that includes a floor provided with at least one eccentrically disposed discharge opening; the apparatus including a support shaft; an impeller wheel mounted on the support shaft in the vicinity of the floor; a mechanism for moving the impeller wheel for assisting the discharge of the bulk material through the discharge opening; the improvement wherein said impeller wheel has a hub; an impeller vane extending radially outwardly from said hub; any cross-sectional area of said vane having the shape of a triangle with an obtuse angle; the longest side of said triangle being disposed parallel to said floor; the obtuse angle of different vane cross sections continuously increasing to the maximum value of 180° with an increasing distance of the different cross sections from said hub.

13. An apparatus as defined in claim 12, wherein each said cross section has the shape of an isosceles triangle.

14. In an apparatus for discharging bulk material from a storage tank that includes a floor provided with at least one eccentrically disposed discharge opening; the apparatus including a support shaft; an impeller wheel mounted on the support shaft in the vicinity of the floor; a stepping mechanism for intermittently moving the impeller wheel; the stepping mechanism having a ratchet wheel mounted on the support shaft and connected to the impeller wheel and a pawl mechanism cooperating with the ratchet wheel and having at least one power cylinder for moving the pawl mechanism; the ratchet wheel has a plurality of circumferentially distributed ratchet teeth each having tooth flanks and any two adjoining tooth flanks belonging to adjoining ratchet teeth defining a tooth gap for receiving a component of the pawl mechanism; and a hydraulic circuit coupled to the power cylinder for energizing the same; the improvement comprising (a) means forming part of said stepping mechanism for selectively rotating said impeller wheel in either direction;

(b) effective pawl-engaging faces forming part of both tooth flanks of any flank pair defining a tooth gap for transmitting to said impeller wheel both pushing and pulling forces exerted on said component of said pawl mechanism by said power cylinder;

(c) sensor means for sensing the magnitude of the resistance of the bulk material to the motion of said impeller wheel;

(d) control means connected to said sensor means and said stepping mechanism for reversing the direction of rotation upon said resistance reaching a predetermined magnitude;

(e) a setting means coupled to said control means and said pawl mechanism for moving said component of said pawl mechanism into and out of said tooth gaps; and (f) at least one impeller vane forming part of said impeller wheel and associated with said at least one discharge opening; said vane being arranged for moving past its associated discharge opening in either direction.

* * * * *